United States Patent
Tsujinaka

(10) Patent No.: US 11,670,757 B2
(45) Date of Patent: Jun. 6, 2023

(54) NEGATIVE ELECTRODE PLATE CONTAINING ORGANIC EXPANDER IN NEGATIVE ELECTRODE MATERIAL AND LEAD-ACID BATTERY COMPRISING THE NEGATIVE ELECTRODE PLATE

(71) Applicant: GS Yuasa International Ltd., Kyoto (JP)

(72) Inventor: Akihito Tsujinaka, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 89 days.

(21) Appl. No.: 17/046,485

(22) PCT Filed: Mar. 26, 2019

(86) PCT No.: PCT/JP2019/012754
§ 371 (c)(1),
(2) Date: Oct. 9, 2020

(87) PCT Pub. No.: WO2019/198491
PCT Pub. Date: Oct. 17, 2019

(65) Prior Publication Data
US 2021/0036308 A1    Feb. 4, 2021

(30) Foreign Application Priority Data
Apr. 12, 2018    (JP) .............................. JP2018-077106

(51) Int. Cl.
| | |
|---|---|
| H01M 4/14 | (2006.01) |
| H01M 4/62 | (2006.01) |
| H01M 4/66 | (2006.01) |
| H01M 4/02 | (2006.01) |

(52) U.S. Cl.
CPC ............. *H01M 4/14* (2013.01); *H01M 4/627* (2013.01); *H01M 4/66* (2013.01); *H01M 2004/027* (2013.01); *H01M 2004/028* (2013.01)

(58) Field of Classification Search
CPC .......... H01M 4/14; H01M 4/627; H01M 4/66; H01M 2004/027; H01M 2004/028; Y02E 60/10
See application file for complete search history.

(56) References Cited

U.S. PATENT DOCUMENTS

2016/0380311 A1    12/2016  Motoi

FOREIGN PATENT DOCUMENTS

| JP | 2002-134114 A | 5/2002 |
| JP | 2006-196191 A | 7/2006 |
| JP | 2014-123510 A | 7/2014 |

(Continued)

OTHER PUBLICATIONS

Machine translation of JP 2017155111A, Yamashita et al., 2017 (Year: 2017).*

(Continued)

*Primary Examiner* — Kwang Han
(74) *Attorney, Agent, or Firm* — Rankin, Hill & Clark LLP

(57) ABSTRACT

A negative electrode plate for a lead-acid battery includes a negative electrode current collector and a negative electrode material. The negative electrode material contains an organic expander. The organic expander includes a condensate containing a bisphenol S unit and a phenolsulfonic acid unit.

6 Claims, 1 Drawing Sheet

(56) References Cited

FOREIGN PATENT DOCUMENTS

| JP | 2015-183171 A | | 10/2015 | | |
|---|---|---|---|---|---|
| JP | 5884528 B2 | | 3/2016 | | |
| JP | 6066119 B2 | | 1/2017 | | |
| JP | 2017155111 A | * | 9/2017 | ............ | C08G 14/08 |
| JP | 2018-18742 A | | 2/2018 | | |
| WO | 2015/079631 A1 | | 6/2015 | | |
| WO | WO 2015087695 A1 | * | 6/2015 | ............ | C01B 31/12 |
| WO | 2016/084858 A1 | | 6/2016 | | |
| WO | 2017/110594 A1 | | 6/2017 | | |
| WO | WO 2017110594 A1 | * | 6/2017 | ............ | H01M 10/06 |

OTHER PUBLICATIONS

Machine translation of WO 2017110594A1, Morikawa et al., 2017 (Year: 2017).*

Machine translation of WO 2015087695A1, Higashimura et al., 2015 (Year: 2015).*

International Search Report (ISR) dated Jun. 11, 2019 filed in PCT/JP2019/012754.

* cited by examiner

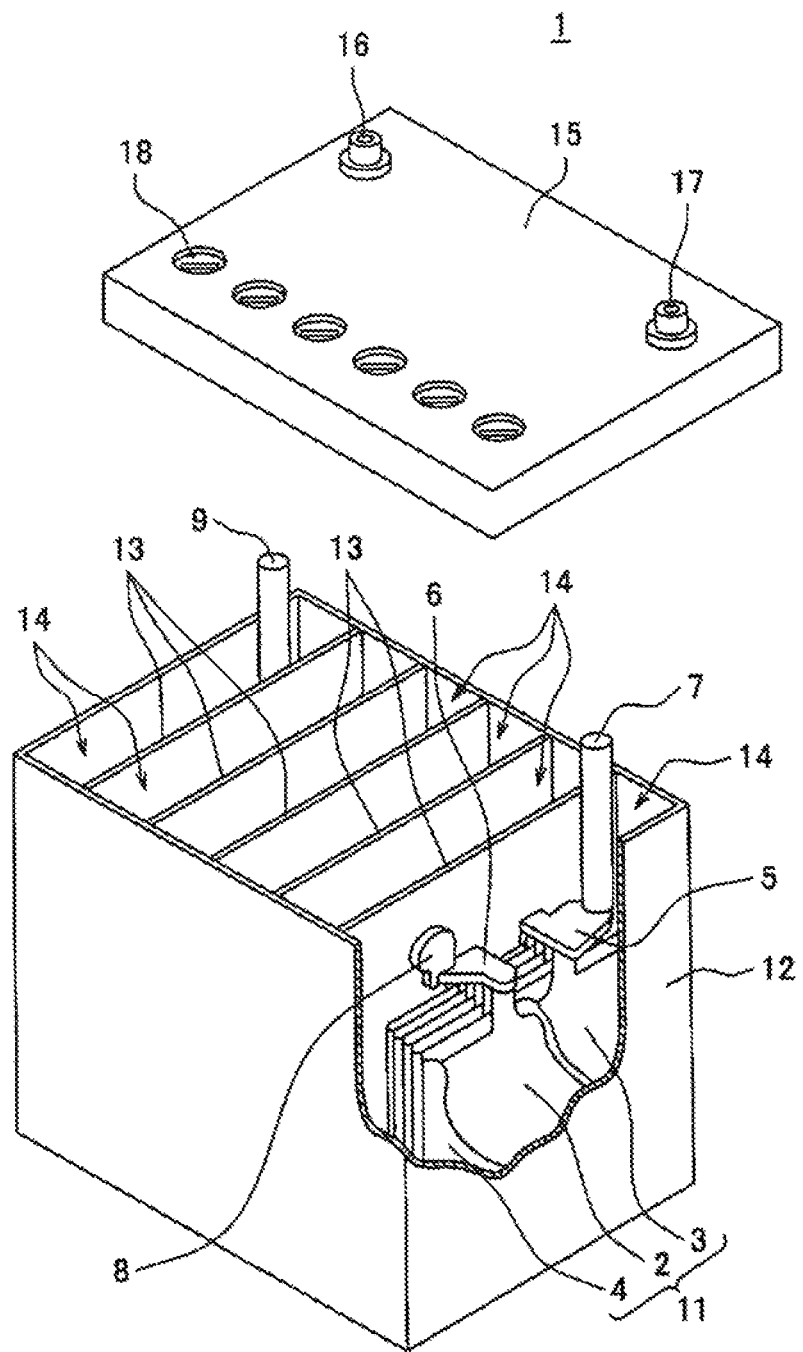

NEGATIVE ELECTRODE PLATE CONTAINING ORGANIC EXPANDER IN NEGATIVE ELECTRODE MATERIAL AND LEAD-ACID BATTERY COMPRISING THE NEGATIVE ELECTRODE PLATE

TECHNICAL FIELD

The present invention relates to a lead-acid battery.

BACKGROUND ART

Lead-acid batteries are used in various applications in addition to in-vehicle and industrial applications. The lead-acid battery includes a negative electrode plate, a positive electrode plate, and an electrolyte solution. The negative electrode plate includes a current collector and a negative electrode material. An organic expander is added to the negative electrode material. As the organic expander, a naturally-occurring organic expander such as sodium lignin-insulfonate may be used, as well as a synthetic organic expander. Examples of synthetic organic expanders include condensates of bisphenol.

Patent Document 1 describes a lead-acid battery having a positive electrode plate, a negative electrode plate, and a microporous resin separator, in which the separator has a total pore volume ratio of 55% or more and less than 75%, and a negative electrode material of the negative electrode plate contains a bisphenol condensate.

As a synthetic organic expander, a condensate using bisphenol A and bisphenol S and the like have been studied.

PRIOR ART DOCUMENT

Patent Document

Patent Document 1: WO 2015/079631 A

SUMMARY OF THE INVENTION

Problems to be Solved by the Invention

If the negative electrode material contains an organic expander, it becomes easy to secure a fine pore structure in the negative electrode material. However, depending on the type of the organic expander, the organic expander may flow out during charge-discharge, so that a sufficient anti-shrink effect may not be obtained, and low-temperature high-rate performance may deteriorate.

Means for Solving the Problems

One aspect of the present invention relates to a negative electrode plate for a lead-acid battery including a negative electrode current collector and a negative electrode material, in which the negative electrode material contains an organic expander, and the organic expander contains a condensate containing a bisphenol S unit and a phenolsulfonic acid unit.

Advantages of the Invention

According to the above aspect of the present invention, it is possible to suppress deterioration of low-temperature high-rate performance in a lead-acid battery.

BRIEF DESCRIPTION OF THE DRAWINGS

FIG. 1 is a partially cut away exploded perspective view showing an external appearance and an internal structure of a lead-acid battery according to one aspect of the present invention.

MODE FOR CARRYING OUT THE INVENTION

A negative electrode plate for a lead-acid battery according to one aspect of the present invention includes a negative electrode current collector and a negative electrode material. The negative electrode material contains an organic expander, and the organic expander includes a condensate containing a bisphenol S unit and a phenolsulfonic acid unit.

The present invention also includes a lead-acid battery provided with the above-mentioned negative electrode plate, positive electrode plate, and electrolyte solution.

Conventionally, as a synthetic organic expander, a condensate using bisphenol has been used from the viewpoint of easily forming a fine colloid in sulfuric acid. As such a condensate, for example, a condensate of bisphenol A, bisphenol S, and formaldehyde, and a condensate of bisphenol, aminobenzenesulfonic acid, and formaldehyde are generally used. However, the present inventor has found that when these condensates are used as an organic expander in a negative electrode material, the effect of the organic expander is not sufficiently exerted, and the low-temperature high-rate performance is likely to decrease. This is presumably due to the following reasons.

First, in a bisphenol A skeleton having a structure in which two benzene rings are connected by a dimethylmethylene group, a dimethylmethylene portion is easily exposed from the plane of a benzene ring to form a three-dimensional structure. Since the dimethylmethylene group of the bisphenol A skeleton has a low electron-withdrawing property, a condensate using bisphenol A has low negative chargeability. An aminobenzenesulfonic acid skeleton has a high electron-donating property at a portion derived from an amino group, so that the condensate as a whole has low negative chargeability. From these points, the condensate using bisphenol A and a condensate using bisphenol and aminobenzenesulfonic acid hardly interact with lead of a negative active material contained in the negative electrode material, and therefore, it is difficult to obtain sufficient adsorption power. As a result, it is considered that the condensate flows out, and it becomes difficult to secure a sufficient anti-shrink effect, so that the low-temperature high-rate performance deteriorates.

On the other hand, according to the above aspect of the present invention, the organic expander containing the condensate containing the bisphenol S unit and the phenolsulfonic acid unit is used for the negative electrode material. A degree of exposure of a sulfonyl group of the bisphenol S unit from the plane is smaller than that of the dimethylmethylene group of the bisphenol A unit, and the phenolsulfonic acid unit has a planar structure unlike the bisphenol A unit. Thus, a structure of the condensate containing the bisphenol S unit and the phenolsulfonic acid unit also tends to become a planar structure. Such a condensate is more likely to be negatively charged than the case where the bisphenol A unit is contained due to presence of the sulfonyl group of the bisphenol S unit. The above condensate is more likely to be negatively charged than when using aminobenzene sulfonic acid. Thus, when such a condensate is used as an organic expander, the condensate easily interacts with a surface of lead contained in the negative electrode material and is easily adsorbed. When the condensate is adsorbed on the surface of lead, the condensate can be allowed to act so that the spongy lead has a finer structure when spongy lead as an active material is produced by formation or charging as described later. When the condensate is likely to be adsorbed on the surface of lead, the condensate is likely to remain in the negative electrode material, so that the anti-shrink effect is sufficiently exerted and a fine structure of the active material is maintained. By maintaining the fine structure of the active material, a specific surface area of the active material is increased, so that it is possible to suppress deterioration of the low-temperature high-rate performance.

The bisphenol S unit refers to a unit derived from a bisphenol S compound incorporated in the condensate. The bisphenol S unit has a diphenyl sulfone skeleton and may have a substituent on the phenyl group. The phenolsulfonic acid unit refers to a unit derived from a phenolsulfonic acid compound incorporated in a condensate. The phenolsulfonic acid unit has a benzene skeleton having a sulfonic acid group or a salt thereof, and may have a substituent on the benzene ring. Examples of the substituent include a substituent other than an amino group, and a substituent represented by $R^3$ described later and the like are preferable.

In the condensate, a molar ratio of the phenolsulfonic acid unit to a total amount of the bisphenol S unit and the phenolsulfonic acid unit is preferably 10 mol % or more and 80 mol % or less. When the molar ratio of the phenolsulfonic acid unit is 10 mol % or more, the condensate is likely to have a planar structure.

In the condensate, the molar ratio of the phenolsulfonic acid unit to the total amount of the bisphenol S unit and the phenolsulfonic acid unit is preferably 20 mol % or more and 80 mol % or less. When the molar ratio of the phenolsulfonic acid unit is 20 mol % or more, the condensate is more likely to have a planar structure. When the molar ratio of the phenolsulfonic acid unit is 80 mol % or less, the condensate is more easily negatively charged. Thus, lowering of the low-temperature high-rate performance can be further suppressed.

The condensate includes a first condensate, and the first condensate is preferably a condensate of at least a bisphenol S compound, a phenolsulfonic acid compound, and an aldehyde compound. The first condensate as described above is easy to synthesize and easy to obtain, and, at the same time, it is easy to obtain the effect of suppressing the deterioration of the low-temperature high-rate performance.

The elemental sulfur content of the organic expander may be 3900 μmol/g or more.

The elemental sulfur content in the organic expander is preferably 4000 μmol/g or more. In this case, colloidal particles of the first organic expander having a proper particle size are easily formed, so that the effect of suppressing the outflow of the first organic expander can be further enhanced. Thus, higher low-temperature high-rate performance can be secured.

The elemental sulfur content in the organic expander being X μmol/g indicates that the elemental sulfur content in 1 g of the organic expander is X μmol.

The present invention also includes a lead-acid battery including the above negative electrode plate for a lead-acid battery, a positive electrode plate, and an electrolyte solution. In such a lead-acid battery, it is possible to suppress a decrease in low-temperature high-rate performance.

Hereinafter, although the negative electrode plate for a lead-acid battery and the lead-acid battery according to the embodiment of the present invention is demonstrated for every main constituent element, this invention is not limited to the following embodiment.

[Negative Electrode Plate]

The negative electrode plate includes a negative electrode current collector and a negative electrode material. The negative electrode material is obtained by removing the negative electrode current collector from the negative electrode plate. Members such as a mat and pasting paper may be applied to the negative electrode plate. Since such a member (application member) is used integrally with the negative electrode plate, the member is assumed to be included in the negative electrode plate. When the negative electrode plate includes such a member, the negative electrode material is obtained by removing the negative electrode current collector and the application member. However, when the application member such as a mat is stuck to the separator, the thickness of the application member is included in the thickness of the separator.

The negative electrode current collector may be formed by casting lead (Pb) or a lead alloy, or may be formed by processing a lead sheet or a lead alloy sheet. Examples of the processing method include expanding and punching. It is preferable to use a negative electrode grid as the negative electrode current collector because the negative electrode material can be easily carried.

The lead alloy used for the negative electrode current collector may be any of a Pb—Sb alloy, a Pb—Ca alloy, and a Pb—Ca—Sn alloy. These lead or lead alloy may further contain at least one selected from the group consisting of Ba, Ag, Al, Bi, As, Se, Cu and the like as an additive element.

The negative electrode material contains an organic expander. Furthermore, the negative electrode material includes a negative active material (lead or lead sulfate) that exhibits capacity by an oxidative-reductive reaction. The negative electrode material may contain an expander other than the organic expander, a carbonaceous material, barium sulfate, fibers (such as resin fibers), etc. and may contain other additives if necessary. Although the negative active material in a charged state is spongy lead, the unformed negative electrode plate is usually produced using lead powder.

The organic expander is an organic polymer containing elemental sulfur. In the above aspect of the present invention, the organic expander contains at least a condensate (first organic expander) containing a bisphenol S unit and a phenolsulfonic acid unit The organic expander may contain an organic expander (second organic expander) other than the first organic expander, if necessary.

In the first organic expander, the bisphenol S unit is preferably one represented by the following formula (1), and more preferably one represented by the following formula (1a). The phenolsulfonic acid unit is preferably one represented by the following formula (2), and more preferably one represented by the following formula (2a). Since the first organic expander having such a unit has a high absorptivity to the surface of lead and is likely to remain in the negative electrode material, it is easy to secure high low-temperature high-rate performance.

[CHEM. 1]

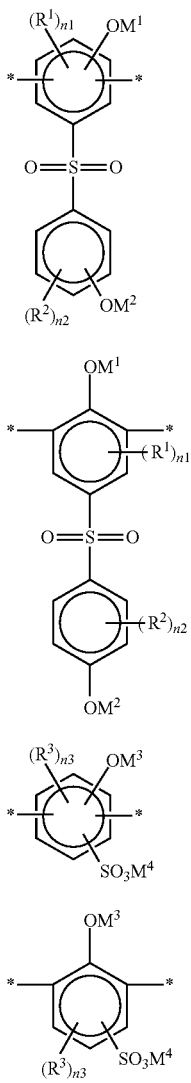

(In the formula, $R^1$, $R^2$, and $R^3$ each represent an alkyl group or a —$SO_3M^5$ group, $M^1$, $M^2$, $M^3$, $M^4$, and $M^5$ each represent an alkali metal or a hydrogen atom, and n1 and n3 each represent an integer of 0 to 2, and n2 is an integer of 0 to 4. * represents a bond, in the formula (1), each bond is in position ortho or para to the —$OM^1$ group, and in the formula (2), each bond is in position ortho or para to the —$OM^3$ group.)

Examples of the alkyl group represented by $R^1$ to $R^3$ include $C_{1-6}$ alkyl groups (preferably $C_{1-4}$ alkyl groups) such as methyl, ethyl, propyl, and butyl. Examples of the alkali metal represented by $M^1$ to $M^5$ include sodium, potassium, and lithium.

n1 and n3 are each an integer of 0 to 2, and may be 0 or 1. n2 is an integer of 0 to 4, preferably an integer of 0 to 2, and may be 0 or 1. In the formula (1), each bond is preferably in position ortho to the —$OM^1$ group. In the formula (2), each bond is preferably in position ortho to the —$OM^3$ group.

The first organic expander may be a condensate containing a bisphenol S unit (first unit) and a phenolsulfonic acid unit (second unit). The first organic expander may contain one type of bisphenol S unit, or may contain two or more types of bisphenol S units. The first organic expander may contain one type of phenolsulfonic acid unit, or may contain two or more types of phenolsulfonic acid units.

A molar ratio of the second unit to a total amount of the first unit and the second unit is, for example, 10 mol % or more and 90 mol % or less, and preferably 20 mol % or more and 80 mol % or less. When the molar ratio of the second unit is within such a range, the first organic expander is more likely to have a planar structure, and, at the same time, the negative chargeability is enhanced, so that the low-temperature high-rate performance can be further enhanced.

The molar ratio of the second unit to the total amount of the first unit and the second unit is preferably 10 mol % or more and may be 15 mol % or more, may be 20 mol % or more, may be 90 mol % or less, may be 85 mol % or less, or may be 80 mol % or less.

The first organic expander may include a unit (third unit) having an aromatic ring other than the bisphenol S unit and the phenolsulfonic acid unit. Examples of such a third unit include a bisphenol unit other than the bisphenol S unit (for example, a bisphenol A unit, a bisphenol F unit, etc.), a biphenyl unit, a naphthalene unit, and a benzene unit. The third unit may have a substituent such as a hydroxy group, a sulfonic acid group or a salt thereof, an amino group, or an alkylamino group.

A molar ratio (=m3/m12) of an amount m3 of the third unit to a total amount m12 of the first unit and the second unit is, for example, 0.2 or less, and preferably 0.1 or less. When the molar ratio of the third unit is in such a range, the effects of the first unit and the second unit are likely to be exhibited.

Examples of the first organic expander including the first unit and the second unit include a condensate of a bisphenol S compound, a phenolsulfonic acid compound, and an aldehyde compound. Examples of the first organic expander including the third unit include a condensate of a bisphenol S compound, a phenolsulfonic acid compound, a compound corresponding to the third unit, and an aldehyde compound.

The first organic expander may be used alone, or in combination of two or more thereof.

As the bisphenol S compound and the phenolsulfonic acid compound, a compound corresponding to the bisphenol S unit and a compound corresponding to the phenolsulfonic acid unit can be used, respectively. As the bisphenol S compound, for example, a compound in which the bond of the unit represented by the above formula (1) or (1a) is replaced with a hydrogen atom is preferable. As the phenolsulfonic acid compound, for example, a compound in which the bond of the unit represented by the above formula (2) or (2a) is replaced with a hydrogen atom is preferable.

Examples of the aldehyde compound include formaldehyde and aldehyde condensates (or polymers) such as paraformaldehyde, trioxane, and tetraoxymethylene. The aldehyde compound may be used alone, or in combination of two or more thereof. Formaldehyde is preferable from the viewpoint of high reactivity with the bisphenol S compound and the phenolsulfonic acid compound.

When the elemental sulfur content in which the elemental sulfur content of the first organic expander is, for example, 2000 µmol/g or more is within such a range, it is conceivable that the colloidal particles of the first organic expander having a proper particle size are easily formed, so that the outflow of the first organic expander is further enhanced, and a pore structure of the negative electrode material is maintained; therefore, higher low-temperature high-rate performance can be obtained. From the viewpoint of being able to secure higher low-temperature high-rate performance and 5-hour rate capacity, the elemental sulfur content in the first organic expander is preferably 3000 µmol/g or more and more preferably 4000 µmol/g or more. The upper limit of the elemental sulfur content of the first organic expander is not particularly limited, and is preferably 9000 µmol/g or less. From the viewpoint of obtaining higher low-temperature high-rate performance, the upper limit of the elemental sulfur content is preferably 6000 µmol/g or less or 5000 µmol/g or less. Any of these lower limit values and upper limit values can be combined.

In the first organic expander, elemental sulfur is contained as a sulfur-containing group (such as a sulfonyl group, a sulfonic acid group or a salt thereof). For example, by adjusting an introduction amount of a sulfonic acid group (such as —$SO_3M^4$ or —$SO_3M^5$), the elemental sulfur content in the first organic expander can be adjusted.

The first organic expander can be synthesized by a known method. For example, the first organic expander can be obtained by condensing a bisphenol S compound, a phenolsulfonic acid compound, and optionally other components (such as aldehyde compound). The sulfonic acid group or a salt thereof may be introduced into the condensate by carrying out the condensation in the presence of a sulfite such as sodium sulfite. When the first organic expander contains the third unit, the compound corresponding to the third unit may be condensed with a bisphenol S compound and a phenolsulfonic acid compound (optionally aldehyde compound) to obtain the first organic expander.

The content of the first organic expander in the negative electrode material is, for example, 0.01% by mass or more and is preferably 0.02% by mass or more and more preferably 0.05% by mass or more. When the content is within such a range, the first organic expander can be more easily adsorbed on the active material, so that the effect of improving the low-temperature high-rate performance can be further enhanced. The content of the first organic expander in the negative electrode material is preferably 1.0% by mass or less, more preferably 0.8% by mass or less, and still more preferably 0.3% by mass or less. When the content is within such a range, high low-temperature high-rate performance can be secured, and, at the same time, excessive adsorption of the first organic expander to the active material can be suppressed to secure high charge acceptance performance. Any of these lower limit values and upper limit values can be combined.

As the second organic expander, for example, lignins may be used, or a condensate other than the first organic expander may be used. Examples of lignins include lignin and lignin derivatives such as lignin sulfonic acid or salts thereof (such as alkali metal salts such as sodium salts). Examples of the condensate other than the first organic expander include a condensate using formaldehyde of an aromatic compound having a sulfur-containing group (however, the first organic expander is excluded). As the aromatic compound, it is preferable to use bisphenols (such as bisphenol A, bisphenol S, and bisphenol F), biphenyls, naphthalenes and the like. The second organic expander may be used alone, or in combination of two or more thereof.

The content of lignins in the negative electrode material is, for example, 0.01% by mass or more and 1.0% by mass or less and is preferably 0.02% by mass or more and 0.8% by mass or less, and more preferably 0.05% by mass or more and 0.3% by mass or less. When the content of the lignins is within such a range, it is possible to suppress liquid reduction during charging. The content of the condensate as the second organic expander in the negative electrode material is preferably 0.05% by mass or less and more preferably 0.01% by mass or less. When the content of the condensate as the second organic expander is within such a range, the effect of the first organic expander is likely to be exhibited.

As the carbonaceous material contained in the negative electrode material, carbon black, graphite, hard carbon, and/or soft carbon can be used. Examples of carbon black include acetylene black, ketjen black, furnace black, and lamp black. As the graphite, any carbon material including a graphite type crystal structure may be used, and any of artificial graphite and natural graphite may be used.

The content of the carbonaceous material in the negative electrode material is, for example, preferably 0.05% by mass or more, and more preferably 0.2% by mass or more. On the other hand, the content of the carbonaceous material in the negative electrode material is preferably 4% by mass or less, more preferably 3% by mass or less, and further preferably 2% by mass or less. Any of these lower limit values and upper limit values can be combined.

The negative electrode plate can be formed by filling a negative electrode current collector with a negative electrode paste, curing and drying to produce an unformed negative electrode plate, and then forming the unformed negative electrode plate. The negative electrode paste is prepared by adding water and sulfuric acid to a lead powder, an organic expander, and optionally various additives and mixing the mixture. In the curing step, it is preferable to cure the unformed negative electrode plate at a temperature higher than room temperature and high humidity.

The formation can be performed by, for example, charging the negative electrode plate in a state in which the element including the unformed negative electrode plate is immersed in an electrolyte solution containing sulfuric acid. Further, the formation may be performed in a container of the lead-acid battery. Furthermore, after the element and the lead-acid battery are assembled, the formation may be performed by charging in a state in which the element is immersed in the electrolyte solution in the container. By the formation, spongy lead is produced on the negative electrode plate.

Hereinafter, analysis of the expander and the carbonaceous material contained in the negative electrode material and a method of determining physical properties will be described.

First, a fully charged lead-acid battery is disassembled, and a negative electrode plate is taken out, washed with water to remove a sulfuric acid component, and vacuum dried (dried under a pressure lower than atmospheric pressure). Next, the negative electrode material is separated from the negative electrode plate, and an unground initial sample is obtained.

(A) Analysis of Expander (A-1) Identification of Type of Expander

Identification of a type of an expander in the negative electrode material is performed in the following manner.

An unground initial sample is ground, and the ground initial sample is immersed in a 1 mol/L NaOH aqueous solution to extract the expander. Then, a first organic expander and other expanders are separated from the extract. For each separated material containing each expander, the solution freed of insoluble components by filtration is desalted, and then concentrated and freeze-dried to obtain a powder sample. For desalting, a dialysis membrane, a desalting column, and/or an ion exchange membrane are used. The type of an expander is identified using information obtained from, for example, the infrared spectrum and NMR spectrum measured using the powder sample of the expander thus obtained and an ultraviolet-visible absorption spectrum measured by an ultraviolet-visible absorption spectrometer after the powder sample is diluted with distilled water.

The first organic expander and other expanders are separated from the extract as follows. First, the extract is measured by infrared spectroscopy, NMR, and/or GC-MS to determine whether or not a plurality of types of expanders are contained. Next, a molecular weight distribution is measured by GPC analysis of the extract, and if a plurality of types of expanders can be separated by molecular weight, the expander is separated by column chromatography based on a difference in molecular weight. When separation based on the difference in molecular weight is difficult, the first organic expander is separated by a precipitation separation method using a difference in solubility that varies depending on the type and/or amount of functional groups of the expander. Specifically, an aqueous sulfuric acid solution is added dropwise to a mixture obtained by dissolving the extract in an aqueous NaOH solution to adjust pH of the mixture, thereby aggregating and separating the first expander. When the separation by aggregation is difficult, the first organic expander is separated by ion exchange chromatography or affinity chromatography using a difference in the type and amount of the functional group. As described above, insoluble components are removed by filtration from a solution obtained by dissolving the separated material in an NaOH aqueous solution again. Furthermore, the remaining solution after separating the first organic expander is concentrated. When the resulting concentrate contains another expander, insoluble components are removed from this concentrate by filtration as described above.

In the present specification, a full charge state of the lead-acid battery is a state in which in the case of a flooded battery, after constant current charge is performed at a current 0.2 times the value described in the rated capacity in a water bath at 25° C. until 2.5 V/cell is reached, constant current charge is further performed for two hours at a current 0.2 times the value described in the rated capacity. In the case of a valve regulated battery, the full charge state is a state in which constant current constant voltage charge is performed at 2.23 V/cell and a current 0.2 times the value described in the rated capacity in a thermostatic bath of 25° C., and the charge is finished once a charge current during the constant voltage charge reaches a value 0.005 times the value described in the rated capacity.

The lead-acid battery in the full charge state is a fully charged formed lead-acid battery. As long as after the formation, the lead-acid battery may be fully charged immediately after the formation, or after a lapse of time from the formation (for example, after the formation, the lead-acid battery may be fully charged during use (preferably in the initial stage of use). The battery in the initial stage of use is a battery in a state in which not much time has passed since the start of use, which has not deteriorated so much.

(A-2) Calculation of Molar Ratio of Constituent Unit of Expander

A sample of the first organic expander separated similarly to the above (A-1) is dissolved in a heavy aqueous solution of sodium hydroxide (pH 10 to 13) to prepare a sample, and $^1$H-NMR is measured using this sample. In a $^1$H-NMR spectrum, a peak ($P_{bs}$) derived from a bisphenol S unit is seen in a range of 6.5 ppm or more and 6.6 ppm or less, and a peak ($P_{ps}$) derived from a phenolsulfonic acid unit is seen in a range of more than 6.6 ppm and 7.0 ppm or less. A relationship of a ratio of a peak intensity $I_{bs}$ of the peak $P_{bs}$ and a peak intensity $I_{ps}$ of the peak $P_{ps}$, and a mole fraction $m_{bs}$ of the bisphenol S unit, and a mole fraction $m_{ps}$ of the phenolsulfonic acid unit is represented by the following formula.

$$m_{bs}:m_{ps}=(1/2)I_{bs}:(8/3)I_{ps}$$

This relationship can be obtained from $^1$H-NMR of the first expander with a known molar ratio of the bisphenol S unit and the phenolsulfonic acid unit. Then, a ratio (mol %) of the mole fraction $m_{ps}$ of the phenolsulfonic acid unit to a total of the mole fraction $m_{bs}$ and the mole fraction $m_{ps}$ is calculated and used as the molar ratio of the second unit described above.

When the first organic expander contains the third unit, the molar ratio of the third unit is determined by selecting a peak derived from the third unit from a structure of the type of the expander identified in the above procedure and the above $^1$H-NMR spectrum and calculating a ratio of an integrated value of this peak to a total of integrated values of peaks of the bisphenol S unit (first unit) and the phenolsulfonic acid unit (second unit). When the molar ratio is determined from the integrated value of the peak, an expander which contains the same monomer unit as the identified structure and whose molar ratio of each monomer unit has been known is synthesized. A relationship between a peak intensity ratio derived from each unit in the $^1$H-NMR spectrum of this expander and a ratio of the mole fraction is determined as with the bisphenol S unit and the phenolsulfonic acid unit, and the molar ratio of the third unit is calculated from this relationship.

(A-3) Measurement of Elemental Sulfur Content in First Organic Expander 0.1 g of a powder sample of the first organic expander separated similarly to (A-1) is taken to obtain an eluate in which an S element in the powder sample is converted into sulfuric acid by an oxygen combustion flask method. Then, the eluate is titrated with barium perchlorate using thorin as an indicator to determine the elemental sulfur content in 0.1 g of the powder sample. This elemental sulfur content is converted into a quantity per 1 g to obtain the elemental sulfur content in first organic expander.

(A-4) Measurement of Content of First Organic Expander

The content of the first organic expander in the negative electrode material is a blending amount (c2 (% by mass)). When the content c2 of the first organic expander is determined for the negative electrode material of the negative electrode plate taken out from the lead-acid battery, the procedure is as follows.

In the same procedure as the above (A-1), a solution is obtained after removing insoluble components by filtration for a separated material containing the first organic expander. For the obtained solution, the ultraviolet-visible absorption spectrometer is measured. Then, based on the ultraviolet-visible absorption spectrometer, the content (c1 (% by mass)) of the first organic expander in the negative electrode material is measured using a calibration curve prepared in advance.

The content c1 of the first organic expander to be measured may become a value different from the content (c2 (% by mass)) of the first organic expander in the negative electrode material (100% by mass) prepared when a lead-acid battery is produced. Thus, the lead-acid batteries are produced for five cases in which the contents c2 of the first organic expanders are different. The content c1 of the first organic expander is measured from the produced lead-acid battery as described above, and an average ratio R (=c1/c2)

of the contents c1 and c2 is obtained in advance. Using the ratio R, the content c2 of the organic expander is calculated from the content c1 of the organic expander obtained from the lead-acid battery as described above.

When the negative electrode material contains another expander such as the second organic expander, the content of a separated material containing this expander is measured as with the first organic expander.

When the content of the expander is measured using a battery manufactured by another company, the same expander may not be used in a calibration curve because a structural formula of the expander cannot be exactly specified. In this case, the calibration curve is created using an expander extracted from a negative electrode from the battery and a separately available expander in which an ultraviolet-visible absorption spectrum, an infrared spectroscopy spectrum, an NMR spectrum and the like show similar shapes, so that the content of the expander is measured using the ultraviolet-visible absorption spectrum. The ratio R is also determined using this available expander.

(B) Analysis of Carbonaceous Material

The unground initial sample is ground, and 50 ml of (1+2) nitric acid is added to 10 g of the ground initial sample and heated for about 20 minutes to dissolve a lead component as lead nitrate. Next, a solution containing lead nitrate is filtered to separate solid contents such as carbonaceous material.

The obtained solid content is dispersed in water to obtain a dispersion, and then components other than a carbonaceous material (for example, reinforcing material) are removed from the dispersion using a sieve. Next, the dispersion is subjected to suction filtration using a membrane filter whose mass has been measured in advance, and the membrane filter is dried together with the filtered sample in a dryer at 110° C. A mass ($m_a$) of the mixed sample is measured by subtracting a mass of the membrane filter from the total mass of the dried mixed sample and the membrane filter. Thereafter, the dried mixed sample is put in a crucible together with the membrane filter, and ashed at 700° C. or higher. The remaining residue is a metal oxide. A mass ($m_b$) of metal sulfate is determined by converting the mass of metal oxide into the mass of metal sulfate. The mass of the carbonaceous material is calculated by subtracting the mass $m_b$ from the mass $m_a$.

[Lead-Acid Battery]

A lead-acid battery includes the negative electrode plate, the positive electrode plate, and the electrolyte solution described above. A separator may be interposed between the negative electrode plate and the positive electrode plate. An element may be formed by the negative electrode plate, the positive electrode plate, and the separator interposed between these electrode plates. The lead-acid battery can be manufactured by, for example, accommodating the positive electrode plate, the negative electrode plate (or the element), and the electrolyte solution in a container.

(Positive Electrode Plate)

There are a paste type and a clad type in the positive electrode plate of the lead-acid battery.

A paste type positive electrode plate is equipped with a positive electrode current collector and a positive electrode material. The positive electrode material is held by the positive electrode current collector. In the paste type positive electrode plate, the positive electrode material is one in which the positive electrode current collector is removed from the positive electrode plate. The positive electrode current collector may be formed similarly to the negative electrode current collector, and can be formed by casting lead or a lead alloy or processing a lead or lead alloy sheet.

A clad type positive electrode plate is equipped with a plurality of porous tubes, a spine inserted into each tube, a positive electrode material filled in the tube in which the spine is inserted, and a joint connecting the plurality of tubes. In the clad type positive electrode plate, the positive electrode material is one in which the tube, the spine, and the joint are removed from the positive electrode plate.

Members such as a mat and pasting paper may be applied to the positive electrode plate. Since such a member (application member) is used integrally with the positive electrode plate, the member is assumed to be included in the positive electrode plate. When the positive electrode plate includes such a member, in the paste type positive electrode plate, the positive electrode material is one in which the positive electrode current collector and the application member are removed from the positive electrode plate, and in the clad type positive electrode plate, the positive electrode material is one in which the tube, the spine, the joint, and the application member are removed from the positive electrode plate.

The lead alloy used for the positive electrode current collector is preferably a Pb—Sb alloy, a Pb—Ca alloy, or a Pb—Ca—Sn alloy in terms of corrosion resistance and mechanical strength. The positive electrode current collector may have lead alloy layers having different compositions, and a plurality of alloy layers may be provided. It is preferable to use a Pb—Sb alloy for the spine.

The positive electrode material includes a positive active material (lead dioxide or lead sulfate) that exhibits capacity by an oxidative-reductive reaction. The positive electrode material may contain other additives as necessary.

An unformed paste type positive electrode plate is obtained by filling a positive electrode current collector with a positive electrode paste, curing and drying as with the negative electrode plate. Then, the unformed positive electrode plate is formed. The positive electrode paste is prepared by mixing a lead powder, additives, water, and sulfuric acid.

The clad type positive electrode plate is formed by filling a tube in which a spine is inserted with a lead powder or slurry-shaped lead powder, and connecting a plurality of tubes with a joint.

(Separator)

Usually, a separator is disposed between a negative electrode plate and a positive electrode plate. A nonwoven fabric, a microporous film, or the like is used for a separator. The thickness and number of separators interposed between the negative electrode plate and the positive electrode plate may be selected according to a distance between electrodes.

A nonwoven fabric is a mat in which fibers are entangled without being woven, and mainly includes fibers. For example, 60% by mass or more of the separator is formed of fibers. As the fiber, glass fiber, polymer fiber (such as polyolefin fiber, acrylic fiber, or polyester fiber such as polyethylene terephthalate fiber), pulp fiber, or the like can be used. Among these fibers, glass fiber is preferable. The nonwoven fabric may contain components other than fibers, such as acid-resistant inorganic powder, a polymer as a binder, and the like.

On the other hand, a microporous film is a porous sheet mainly composed of components other than a fiber component, and, for example, after a composition containing a pore-forming additive (such as polymer powder and/or oil) is extrusion-molded into a sheet, the pore-forming additive is removed to form pores, whereby the microporous film is obtained. The microporous film is preferably composed of a material having acid resistance, and is preferably mainly composed of a polymer component. As the polymer component, polyolefins such as polyethylene and polypropylene are preferable.

For example, a separator may be composed only of a nonwoven fabric or may be composed only of a microporous film. The separator may be, if necessary, a laminate of a nonwoven fabric and a microporous film, a product obtained by applying different types or the same types of materials, or a product obtained by meshing irregularities in different types or the same types of materials.

(Electrolyte Solution)

The electrolyte solution is an aqueous solution containing sulfuric acid, and may be gelled as necessary. A specific gravity at 20° C. of the electrolyte solution in the lead-acid battery in the full charge state is, for example, 1.10 g/cm$^3$ or more and 1.35 g/cm$^3$ or less.

FIG. 1 shows an appearance of an example of the lead-acid battery according to the embodiment of the present invention.

A lead-acid battery 1 includes a container 12 accommodating an element 11 and an electrolyte solution (not shown). The container 12 is partitioned into a plurality of cell chambers 14 by partitions 13. Each of the cell chambers 14 stores one element 11. An opening of the container 12 is closed with a lid 15 equipped with a negative electrode terminal 16 and a positive electrode terminal 17. In the lid 15, a vent plug 18 is provided for each cell chamber. In the water addition, replenishment water is supplied after the vent plug 18 is removed. The vent plug 18 may have a function of discharging gas, generated in the cell chamber 14, out of the battery.

The element 11 is configured by stacking a plurality of negative electrode plates 2 and a plurality of positive electrode plates 3 with a separator 4 interposed therebetween. Herein, although the bag-shaped separator 4 accommodating the negative electrode plate 2 is shown, the form of the separator is not particularly limited. In the cell chamber 14 located at one end of the container 12, a negative electrode strap 6 connecting the plurality of negative electrode plates 2 in parallel is connected to a feedthrough 8, and a positive electrode strap 5 connecting the plurality of positive electrode plates 3 in parallel is connected to a positive electrode pole 7. The positive electrode pole 7 is connected to the positive electrode terminal 17 outside the lid 15. In the cell chamber 14 located at the other end of the container 12, the negative electrode pole 9 is connected to the negative electrode strap 6, and the feedthrough 8 is connected to the positive electrode strap 5. The negative electrode pole 9 is connected to the negative electrode terminal 16 outside the lid 15. Each of the feedthroughs 8 passes through a through-hole provided in the partition 13 and connects the elements 11 of the adjacent cell chambers 14 in series.

EXAMPLES

In the following, the present invention will be described in detail with reference to Examples and Comparative Examples. However, it should be noted that the present invention is not limited to these Examples.

<<Lead-Acid Batteries A1, A2, and B1 to B7>>

(1) Production of Negative Electrode Plate

A negative electrode paste is obtained by mixing a lead powder, water, dilute sulfuric acid, carbon black, and an organic expander. The negative electrode paste is filled in a network portion of an expanded grid made of Pb—Ca—Sn alloy as a negative electrode current collector, and then cured and dried to obtain an unformed negative electrode plate. The amount of carbon black added is adjusted such that the content in 100% by mass of the negative electrode material is 0.30% by mass. The amount of the organic expander added is adjusted such that the content in 100% by mass of the negative electrode material is 0.10% by mass, and the organic expander is added to the negative electrode paste.

The condensate shown in Table 1 is used as the organic expander. The condensates shown in Table 1 are as follows.

a1 (first organic expander): Formaldehyde condensate of bisphenol S and phenolsulfonic acid (=2:8 (molar ratio))

a2 (first organic expander): Formaldehyde condensate of bisphenol S and phenolsulfonic acid (=8:2 (molar ratio))

b1: Condensate obtained by condensing bisphenol S, bisphenol A (=7:3 (molar ratio)), and formaldehyde in the presence of sodium sulfite.

b2: Formaldehyde condensate of bisphenol A and phenolsulfonic acid (=6:4 (molar ratio))

b3: Formaldehyde condensate of bisphenol A and phenolsulfonic acid (=9:1 (molar ratio))

b4: Formaldehyde condensate of bisphenol S and aminobenzenesulfonic acid (=1:9 (molar ratio))

b5: Formaldehyde condensate of bisphenol S and aminobenzenesulfonic acid (=6:4 (molar ratio))

b6: Formaldehyde condensate of bisphenol S and aminobenzenesulfonic acid (=8:2 (molar ratio))

b7: Formaldehyde condensate of bisphenol S and aminobenzenesulfonic acid (=9:1 (molar ratio))

(2) Production of Positive Electrode Plate

A lead powder, water and sulfuric acid are mixed to prepare a positive electrode paste. The positive electrode paste is filled in a network portion of an expanded grid made of Pb—Ca—Sn alloy as a positive electrode current collector, and then cured and dried to obtain an unformed positive electrode plate.

(3) Production of Lead-Acid Battery

An unformed negative electrode plate is accommodated in a bag-shaped separator formed of a polyethylene microporous film, and an element is formed of five unformed negative electrode plates and four unformed positive electrode plates.

The element is inserted into a container, the container is filled with an electrolyte solution, formation is carried out in the container, and flooded lead-acid batteries A1, A2, and B1 to B7 having a nominal voltage of 12 V and a rated capacity of 30 Ah (5 hour rate) are assembled. As the electrolyte solution, an aqueous solution containing sulfuric acid having a specific gravity of 1.28 at 20° C. is used.

In the case of using the organic expander a1 or a2, the first organic expander is separated from the negative electrode material by the above-described procedure for one produced lead-acid battery. With respect to the separated first organic expander, the molar ratio of the bisphenol S unit and the phenolsulfonic acid unit and the elemental sulfur content are determined by the above-described procedure.

In the case of using the organic expanders b1 to b7, the expander is separated from the negative electrode material by the above-described procedure for one produced lead-acid battery. With respect to the separated expander, the elemental sulfur content is determined by the above-described procedure. However, regarding these organic expanders, the molar ratio of each unit is the molar ratio of the monomer when the expander is synthesized.

[Evaluation: Low-Temperature High-Rate (HR) Performance]

The fully charged lead-acid battery is discharged at a discharge current of 150 A at −15° C. until the terminal voltage reaches 1 V, and a discharge time (discharge duration time) (s) at this time is obtained. The ratio (%) when the discharge duration time of the lead-acid battery B1 is 100 is used as an index of the low-temperature high-rate performance.

Table 1 shows the results of the lead-acid batteries A1, A2, and B1 to B7.

TABLE 1

| | | Organic expander | | | | | Low-temperature HR performance (%) |
|---|---|---|---|---|---|---|---|
| | | Unit molar ratio | | | | | |
| Battery No. | Type | Bisphenol S | Bisphenol A | Phenolsulfonic acid | Aminobenzenesulfonic acid | Elemental S content (μmol/g) | |
| A1 | a1 | 2 | 0 | 8 | 0 | 4970 | 140 |
| A2 | a2 | 8 | 0 | 2 | 0 | 4052 | 132 |
| B1 | b1 | 7 | 3 | 0 | 0 | 4577 | 100 |
| B2 | b2 | 0 | 6 | 4 | 0 | 3937 | 113 |
| B3 | b3 | 0 | 9 | 1 | 0 | 4926 | 100 |
| B4 | b4 | 1 | 0 | 0 | 9 | 3951 | 102 |
| B5 | b5 | 6 | 0 | 0 | 4 | 4794 | 109 |
| B6 | b6 | 8 | 0 | 0 | 2 | 5241 | 114 |
| B7 | b7 | 9 | 0 | 0 | 1 | 5498 | 95 |

As shown in Table 1, in the lead-acid batteries A1 and A2 using the first organic expanders a1 and a2, respectively, compared with the lead-acid battery B1 using the condensate b1 of bisphenol S, bisphenol A, and formaldehyde as the organic expander, the low-temperature high-rate performance has been improved from 100% to 132% and 140%, by 32% to 40%. Also in the lead-acid batteries B2 and B3 using the condensates b2 and b3 of bisphenol A, phenolsulfonic acid, and formaldehyde, respectively, the low-temperature high-rate performance is close to the value of the lead-acid battery B1 and is much lower than the values of the lead-acid batteries A1 and A2. Similarly, in the lead-acid batteries B4 to B7 using the condensates b4 to b7 of bisphenol S, aminobenzenesulfonic acid, and formaldehyde, respectively, the low-temperature high-rate performance is close to the value of the lead-acid battery B1. In the lead-acid battery A1, compared with the lead-acid battery B4 having a similar molar ratio of the bisphenol S unit, the low-temperature high-rate performance is significantly improved from 102% to 140% by 38% points. In the lead-acid battery A2, compared with the lead-acid battery B6 having the same molar ratio of the bisphenol S unit, the low-temperature high-rate performance increases from 114% to 132% by 18% points.

It is considered that the low-temperature high-rate performance is improved in the lead-acid batteries A1 and A2 compared with the lead-acid battery B1 because, unlike the bisphenol A unit, the condensate contains the phenolsulfonic acid unit, so that the condensate has a planar structure and remains in the negative electrode material and the anti-shrink effect is sufficiently exerted. It is considered that the low-temperature high-rate performance is improved in the lead-acid batteries A1 and A2 compared with the lead-acid batteries B2 to B7 because since electronegativity of the condensate is high, the negative chargeability is large, so that the adsorption power to lead increases, and the first organic expander remains in the negative electrode material to sufficiently exert the anti-shrink effect.

<<Lead-Acid Batteries A3 to A5>>

The condensates a3 to a5 shown in Table 2 are used as the organic expanders. Except for this, a negative electrode plate is produced similarly to the case of the lead-acid battery A1. Lead-acid batteries A3 to A5 are assembled similarly to the case of the lead-acid battery A1, except that the obtained negative electrode plate is used. For the lead-acid batteries A3 to A5, a low-temperature high-rate duration time (s) is determined as with the lead-acid battery A1. The condensates a3 to a5 are as follows.

a3 (first organic expander): Formaldehyde condensate of bisphenol S and phenolsulfonic acid (=1:9 (molar ratio))

a4 (first organic expander): Formaldehyde condensate of bisphenol S and phenolsulfonic acid (=6:4 (molar ratio))

a5 (first organic expander): Formaldehyde condensate of bisphenol S and phenolsulfonic acid (=9:1 (molar ratio))

In the case of using the organic expanders a3 to a5, the first organic expander is separated from the negative electrode material by the above-described procedure for one produced lead-acid battery. With respect to the separated first organic expander, the molar ratio of the bisphenol S unit and the phenolsulfonic acid unit and the elemental sulfur content are determined by the above-described procedure.

Table 2 shows the results of the lead-acid batteries A3 to A5. Table 2 also shows the results of the lead-acid batteries A1 and A2.

TABLE 2

| Battery No. | Type | Organic expander | | Elemental S content (μmol/g) | Low-temperature HR duration time (s) |
|---|---|---|---|---|---|
| | | Unit molar ratio | | | |
| | | Bisphenol S | Phenolsulfonic acid | | |
| A3 | a3 | 1 | 9 | 5165 | 250 |
| A1 | a1 | 2 | 8 | 4970 | 301 |
| A4 | a4 | 6 | 4 | 4318 | 270 |
| A2 | a2 | 8 | 2 | 4052 | 283 |
| A5 | a5 | 9 | 1 | 3931 | 240 |

As shown in Table 2, when the molar ratio of the phenolsulfonic acid unit is 20 mol % or more and 80 mol % or less, the low-temperature high-rate duration time remarkably increases, and higher low-temperature high-rate performance can be secured. It is considered that this is because the first organic expander is more likely to have a planar structure and the negative chargeability is improved.

In the lead-acid battery A4, a significantly long discharge duration time can be obtained compared with the lead-acid battery B2 having the same molar ratio of the phenolsulfonic acid unit and the lead-acid battery B5 having the same molar ratio of the bisphenol S unit. Also in the lead-acid battery A3, the discharge duration time is significantly improved compared with the lead-acid battery B4 having the same molar ratio of the bisphenol S unit. Similarly, also in the lead-acid battery A5, the discharge duration time is significantly improved compared with the lead-acid battery B3 having the same molar ratio of the phenolsulfonic acid unit and the lead-acid battery B7 having the same molar ratio of the bisphenol S unit.

As shown in Table 2, when the elemental sulfur content of the first organic expander is 4000 μmol/g or more, higher low-temperature high-rate performance can be secured. It is considered that this is because colloidal particles of the first organic expander having a proper particle size are easily formed, so that the outflow of the first organic expander is suppressed, and the pore structure of the negative electrode material is easily maintained.

INDUSTRIAL APPLICABILITY

The negative electrode plate and the lead-acid battery according to one aspect of the present invention can be applied to valve regulated lead-acid batteries and flooded lead-acid batteries. The lead-acid battery can be suitably used as a power source for starting an automobile, a motorcycle, or the like and a power source of an industrial energy storage apparatus of storage of natural energy, electric vehicles (such as forklifts), and the like.

DESCRIPTION OF REFERENCE SIGNS

1: Lead-acid battery
2: Negative electrode plate
3: Positive electrode plate
4: Separator
5: Positive electrode strap
6: Negative electrode strap
7: Positive electrode pole
8: Feedthrough
9: Negative electrode pole
11: Element
12: Container
13: Partition
14: Cell chamber
15: Lid
16: Negative electrode terminal
17: Positive electrode terminal
18: Vent plug

The invention claimed is:

1. A negative electrode plate for a lead-acid battery, comprising:
   a negative electrode current collector; and
   a negative electrode material,
   wherein
   the negative electrode material contains an organic expander,
   the organic expander contains a condensate containing a bisphenol S unit and a phenolsulfonic acid unit, and
   a molar ratio of the phenolsulfonic acid unit to a total amount of the bisphenol S unit and the phenolsulfonic acid unit is 20 mol % or more and 80 mol % or less.

2. The negative electrode plate for a lead-acid battery according to claim 1, wherein
   the condensate includes a first condensate, and
   the first condensate is a condensate of at least a bisphenol S compound, a phenolsulfonic acid compound, and an aldehyde compound.

3. The negative electrode plate for a lead-acid battery according to claim 1, wherein an elemental sulfur content in the organic expander is 3900 μmol/g or more.

4. The negative electrode plate for a lead-acid battery according to claim 1, wherein an elemental sulfur content in the organic expander is 4000 μmol/g or more.

5. A lead-acid battery comprising:
   the negative electrode plate for a lead-acid battery according to claim 1;
   a positive electrode plate; and
   an electrolyte solution.

6. The negative electrode plate for a lead-acid battery according to claim 1, wherein the condensate further contains a unit having an aromatic ring other than the bisphenol S unit and the phenolsulfonic acid unit, and the unit having the aromatic ring includes one selected from a group consisting of a biphenyl unit, a naphthalene unit, a benzene unit, a biphenyl unit having a substituent and a naphthalene unit having a substituent, the substituent including at least one selected from a group consisting of a hydroxy group, a sulfonic acid group, a salt of the sulfonic acid group, an amino group and an alkylamino group.

* * * * *